United States Patent Office 3,726,868
Patented Apr. 10, 1973

3,726,868
PHENYL AND SUBSTITUTED PHENYLSULFONYL-ALLYL AMINES AND SUBSTITUTED AMINES
Robert E. Manning, Mountain Lakes, N.J., assignor to Sandoz-Wander, Inc., Hanover, N.J.
No Drawing. Original application Mar. 16, 1970, Ser. No. 20,110, now Patent No. 3,644,343, dated Feb. 22, 1970. Divided and this application Sept. 16, 1971, Ser. No. 180,885
Int. Cl. C07d 87/46
U.S. Cl. 260—247.1         2 Claims

ABSTRACT OF THE DISCLOSURE

Phenyl and substituted phenylsulfonylallyl amines and substituted amines, e.g., 1-(3-phenylsulfonylallyl)-pyrrolidine hydrochloride, are prepared by treating a phenyl or substituted phenylsulfonyl-2-propen-1-ol with an amine or substituted amine, treating the resulting intermediate with $SOCl_2$ and then with sodium carbonate and allowing the resulting intermediate to rearrange to the final product. The compounds are useful as anti-inflammatory agents.

---

This application is a division of Ser. No. 20,110, filed Mar. 16, 1970, now U.S. Pat. 3,644,343, granted Feb. 22, 1970.

This invention relates to phenyl and substituted phenylsulfonylallyl amines and substituted amines. More particularly, it relates to phenyl and p-substituted phenylsulfonylallyl amines, pyrrolidines and piperidines, morpholines, intermediates thereof and acid addition salts thereof, and to processes for their preparation.

The compounds of this invention may be represented by the following structural formula:

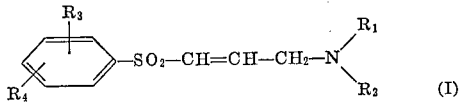

wherein $R_1$ and $R_2$ are independently hydrogen, lower alkyl having 1 to 6 carbon atoms, e.g., methyl, ethyl, propyl, isopropyl, butyl, isobutyl, pentyl, isopentyl, hexyl or isohexyl, or $NR_1R_2$ are together

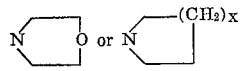

where X is 0 or 1; and $R_3$ and $R_4$ are independently, hydrogen, halo having an atomic weight of from 19 to 36, lower alkyl having 1 to 4 carbon atoms, e.g., methyl, ethyl, propyl, isopropyl, or lower alkoxy having 1 to 4 carbon atoms, e.g., methoxy, ethoxy, propoxy or isopropoxy.

The compounds of Formula I may be prepared (reaction scheme A) by treating a compound of the formula:

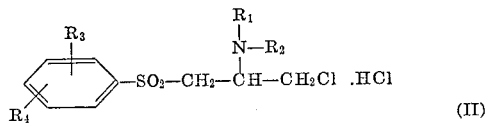

wherein $R_1$, $R_2$, $R_3$ and $R_4$ have the above-stated significance, with an aqueous solution of a base such as sodium carbonate, sodium hydroxide and the like and allowing the resulting free base form of compound (II) to rearrange into compound (I). The rearrangement is preferably carried out in an inert solvent, such as lower alkanol having 1 to 4 carbon atoms, e.g., methanol, ethanol, propanol or isopropanol at a temperature of from 15° to 80° C., preferably 20° to 40° C. for about 4 to 24 hours, preferably 8 to 16 hours. Neither the solvents nor the temperatures used are critical.

The rearrangement of the free base of the compound of Formula II is believed to involve the formation of a compound of the formula:

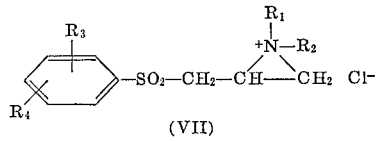

which compound (VII) is believed to rearrange into compound (I). However, the patentability of this invention is not predicated upon this assumption.

The compounds of Formula II may be prepared according to the following reaction scheme B:

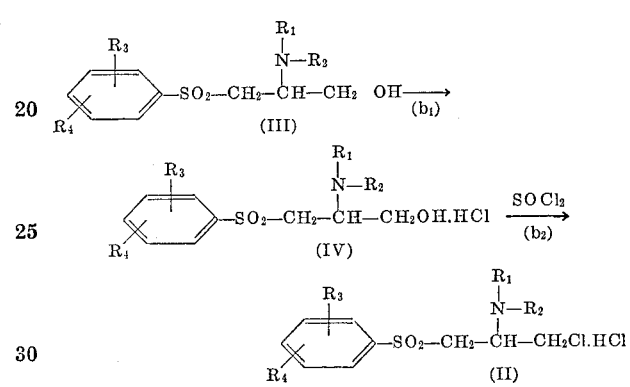

wherein $R_1$, $R_2$, $R_3$ and $R_4$ have the above stated significance.

The compounds of Formula II are prepared by treating a compound of Formula III with gaseous hydrogen chloride (step ($b_1$)) in an inert solvent such as lower alkanol having 1 to 4 carbon atoms, e.g., methanol, ethanol, propanol, or isopropanol, at a temperature of about 20° C., to provide the hydrochloride salt of Formula IV. Compound (IV) is treated with thionylchloride (step ($b_2$)) in a chlorinated hydrocarbon solvent such as methylene chloride, chloroform and the like at a temperature of from about 20° C. to the reflux temperature of the solvent, preferably 30 to 45° C. for about 3 to 38 hours, preferably 12 to 24 hours, to give the compounds of Formula II. Neither the solvents nor the temperatures used in steps ($b_1$) or ($b_2$) are critical.

The compounds of Formula II may alternatively be prepared by treating a compound of Formula III with thionyl chloride in the solvent and under the reaction conditions stated in step ($b_2$) above.

The compounds of Formula III may be prepared according to the following reactions scheme C:

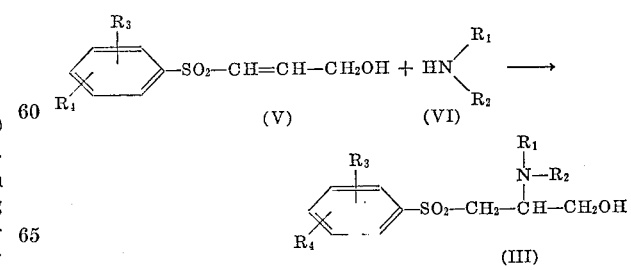

wherein $R_1$, $R_2$, $R_3$ and $R_4$ have the above-stated significance.

The compounds of Formula III are prepared by treating a compound of Formula V with a compound of Formula VI at a temperature of from 20° to 100° C., preferably 25° to 60° C. for about 2 to 24 hours, preferably 8 to 16 hours.

The reaction may be carried out in an inert solvent such as stated in reaction scheme A. Neither the solvent nor the temperatures used are critical.

The compounds of Formulas I, II and III may be prepared in free base form by dissolution of the compound in water and precipitation using a base such as sodium hydroxide. If acid addition salts other than the hydrochloride are desired, they may be prepared by suspending the free base form of Formula III in alcohol or water and treating with the appropriate acid.

The compounds of Formulas I, II and III may be recovered using conventional recovery techniques such as crystallization.

Certain of the compounds of Formulas V and VI are known and may be prepared according to methods disclosed in the literature. Those compounds of Formulas V and VI not specifically disclosed are prepared according to analogous methods from known materials.

The compounds of Formula I are useful because they possess pharmacological activity in animals. More particularly, the compounds are useful as anti-inflammatory agents as indicated by their activity in the rat given 100 mg./kg. of active compound orally and tested using the acute carrageenan-induced edema procedure substantially as described by Winter (Proc. Soc. Exp. Biol., 111, 544, 1962) and given 1 to 50 mg./kg. of active material and tested using the adjuvant arthritic procedure substantially as described by Perrine, J. W., Takesue, E. I. (Arch. Int. Pharmacodyn., 174:192, 1968). For such usage, the compounds may be administered orally or parenterally.

The compound of Example II5 is also useful as a hypolipidemic agent, as indicated by tests on a group of white rats which are given typically 5–50 milligrams per kilogram of body weight per diem of the compound orally, for 6 days, followed by extraction with isopropanol of serum or plasma after anesthetizing the rats with sodium hexobarbital, and then noting the cholesterol and glycerol contents as compared to that of a control group. The cholesterol content is determined by the Technicon method N24a. The glycerol content is determined by the method of Lofland (Anal. Biochem., 9, 393, 1964).

The compounds of Formula I may be similarly administered in the form of their non-toxic pharmaceutically acceptable acid addition salts. Representative of such salts are the hydrobromide, sulfate, phosphate, succinate, benzoate, acetate and the like. Such salts possess the same order of activity as the free base.

The dosage of active ingredient employed for the alleviation of inflammation may vary depending on the severity of the condition being treated. However, in general, satisfactory results are obtained when a compound of Formula I is administered at a daily dosage of from about 0.04 milligram to about 500 milligrams per kilogram of animal body weight, preferably given in divided doses two to four times a day, or in sustained release form. For most larger mammals (e.g., primates) the total daily dosage is from about 1 to about 500 milligrams. Dosage forms suitable for internal use comprise from about 0.25 to about 250 milligrams of the active compound, in intimate admixture with a solid or liquid pharmaceutically acceptable carrier or diluent.

The dosage administered for the hypolidipemic use may vary depending on the therapy desired and the severity of the condition being treated. In general, satisfactory results are obtained when administered at a daily dosage of from about 5 milligrams to about 500 milligrams per kilogram of animal body weight, preferably given in divided doses, 2 to 4 times a day, or in sustained release form. For most larger mammals (e.g., primates) the total daily dosage is from about 10 milligrams to about 2000 milligrams of the compound and the dosage forms suitable for internal use comprise from about 2.5 milligrams to about 1000 milligrams of active compound in intimate admixture with a solid or liquid pharmaceutically acceptable carrier or diluent.

A representative formulation suitable for oral administration is a capsule prepared by standard techniques which contains the following:

| Ingredients— | Parts by weight |
|---|---|
| 1-(3-phenylsulfonylallyl)-pyrrolidine hydrochloride | 50 |
| Inert filler (e.g., starch, kaolin, lactose, etc.) | 250 |

EXAMPLE I 4-(3-phenylsulfonylallyl)morpholine hydrochloride

Step 1.—2-morpholino-3-phenylsulfonylpropanol: A mixture of 3-phenylsulfonyl-2-propen-1-ol (66 g.) and morpholine (48 g.) was allowed to stand for 16 hours. Water (250 ml.) was added and the resultant crystals were collected by filtration. Washing with water gave a crude material, which upon recrystallization from ethanol gave 2-morpholino-3-phenylsulfonylpropanol, M.P. 118°–120° C.

Step 2.—2-morpholino-3-phenylsulfonylpropanol hydrochloride: A suspension of 2-morpholino-3-phenylsulfonylpropanol in methanol (500 ml.) was treated with excess gaseous hydrogen chloride. The resultant solution was concentrated in vacuo to 300 ml., and then ether (300 ml.) was added. The resultant solid was collected by filtration to give 2-morpholino-3-phenylsulfonylpropanol hydrochloride, M.P. 199°–201° C.

Step 3.—1-chloro-2-morpholino-3-phenylsulfonylpropane hydrochloride: A mixture of 1,2-morpholino-3-phenylsulfonylpropanol hydrochloride (75 g.), methylene chloride (750 ml.) and thionyl chloride (59 g.) was heated under reflux with stirring for 20 hours. The reaction mixture was allowed to cool and the resultant solid was collected by filtration. Recrystallization from methanol-ether (1:1) gave 1-chloro-2-morpholino-3-phenylsulfonylpropane hydrochloride, M.P. 125–128° C.

Step 4.—1-chloro-2-morpholino-3-phenylsulfonylpropane: A solution of 1-chloro-2-morpholino-3-phenylsulfonylpropane hydrochloride (67 g.) in water (250 ml.) was treated with 2 N sodium carbonate solution (250 ml.). The resultant solid was collected by filtration and washed with water to give 1-chloro-2-morpholino-3-phenylsulfonylpropane M.P. 100°–101° C.

Step 5.—4-(3-phenylsulfonylallyl)morpholine hydrochloride: A solution of 1-chloro-2-morpholino-3-phenylsulfonylpropane hydrochloride (30 g.) in methanol (300 ml.) was stirred overnight. The reaction was concentrated in vacuo and then ether was added. The resultant solid was collected by filtration to give the product 4-(3-phenylsulfonylallyl)morpholine hydrochloride, M.P. 196° C. dec.

EXAMPLE II

Step 1.—Following the procedure of Example I, step 1 and in place of morpholine, starting with (1) methylamine          (4) tert-butylamine
(2) dimethylamine        (5) pyrrolidine
(3) isopropylamine       (6) piperidine the following intermediate compounds are obtained:

(1) 2-methylamino-3-phenylsulfonylpropanol, as an oil
(2) 2-dimethylamino-3-phenylsulfonylpropanol, as an oil
(3) 2-isopropylamino-3-phenylsulfonylpropanol, as an oil
(4) 2-tert-butylamino-3-phenylsulfonylpropanol, M.P. 67–70° C.
(5) 2-pyrrolidino-3-phenylsulfonylpropanol, M.P. 86–88° C.
(6) 2-piperidino-3-phenylsulfonylpropanol, as an oil.

Step 2.—Following the procedure of Example I, step 2 and using the corresponding intermediate compound of step 1 of this example the following intermediate salts are obtained:

(1) 2-methylamino-3-phenylsulfonylpropanol hydrochloride, M.P. 155–157° C.
(2) 2-dimethylamino-3-phenylsulfonylpropanol hydrochloride, M.P. 155–158° C.
(3) 2-isopropylamino-3-phenylsulfonylpropanol hydrochloride, M.P. 134–138° C.
(4) 2-tert-butylamino-3-phenylsulfonylpropanol hydrochloride, as an oil.
(5) 2-pyrrolidino-3-phenylsulfonylpropanol hydrochloride, M.P. 130–134° C.
(6) 2-piperidino-3-phenylsulfonylpropanol hydrochloride, M.P. 162–165° C.

Step 3.—Following the procedure of Example I, step 3 and using the corresponding intermediate salt of step 2 of this example, the following intermediate compounds are obtained:

(1) 1-chloro-2-methylamino-3-phenylsulfonylpropanol hydrochloride, M.P. 160–162° C.
(2) 1-chloro-2-dimethylamino-3-phenylsulphonylpropanol hydrochloride.
(3) 1-chloro-2-isopropylamino-3-phenylsulfonylpropanol hydrochloride, M.P. 155–158° C.
(4) 1-chloro-2-tert-butylamino-3-phenylsulfonylpropanol hydrochloride, M.P. 171–175° C. dec.
(5) 1-chloro-2-pyrrolidino-3-phenylsulfonylpropanol hydrochloride, as an oil.
(6) 1-chloro-2-piperidino-3-phenylsulfonylpropanol hydrochloride, M.P. 135–137° C.

Step 4.—Following the procedure of Example I, step 4 and using the corresponding compound of step 3 of this example, the following free base compounds are obtained:

(1) 1-chloro-2-methylamino-3-phenylsulfonylpropanol, as an oil.
(2) 1-chloro-2-dimethylamino-3-phenylsulfonylpropanol, as an oil.
(3) 1-chloro-2-isopropylamino-3-phenylsulfonylpropanol, as an oil.
(4) 1-chloro-2-tert-butylamino-3-phenylsulfonylpropanol, as an oil.
(5) 1-chloro-2-pyrrolidino-3-phenylsulfonylpropanol, as an oil.
(6) 1-chloro-2-piperidino-3-phenylsulfonylpropanol, as an oil.

Step 5.—Following the procedure of Example I, step 5 and using the corresponding free base compound of step 4 of this example, the following products are obtained:

(1) N-methyl-3-phenylsulfonylallylamine hydrochloride, M.P. 168–170° C.
(2) N,N-dimethyl-3-phenylsulfonylallylamine, M.P. 68–70° C.
(3) N-isopropyl-3-phenylsulfonylallylamine hydrochloride, M.P. 178–180° C.
(4) N-tert-butyl-3-phenylsulfonylallylamine hydrochloride, M.P. 216° C. dec.
(5) 1-(3-phenylsulfonylallyl)-pyrrolidine hydrochloride, M.P. 145–146° C.
(6) 1-(3-phenylsulfonylallyl)-piperidine hydrochloride, M.P. 189–191° C.

EXAMPLE III

Step 1.—Following the procedure of Example I, step 1 and, in place of 3-phenylsulfonyl-2-propen-1-ol and starting with (1) 3-(p-toluenesulfonyl)-2-propen-1-ol,
(2) 3-(p-chlorophenylsulfonyl)-2-propen-1-ol, and in place of morpholine starting with dimethylamine, the following intermediate products are obtained:

(1) 2-dimethylamino-3-(p-toluenesulfonyl)propanol, as an oil.
(2) 2-dimethylamino-3-(p-chlorophenylsulfonyl)-propanol, as an oil.

Step 2.—Following the procedure of Example I, step 2 and using the corresponding intermediate compound of step 1 of this example the following salts are obtained:

(1) 2-dimethylamino-3-(p-toluenesulfonyl)propanol hydrochloride, M.P. 155–158° C.
(2) 2-dimethylamino-3-(p-chlorophenylsulfonyl) propanol hydrochloride, M.P. 162–164° C.

Step 3.—Following the procedure of Example I, step 3 and using the corresponding intermediate salt of step 2 of this example, the following intermediate compounds are obtained:

(1) 1-chloro-(2-dimethylamino-3-[p-toluenesulfonyl]) propanol hydrochloride, M.P. 155–157° C.
(2) 1-chloro-(2-dimethylamino-3-[p-chlorophenylsulfonyl])propanol hydrochloride, M.P. 180–183° C.

Step 4.—Following the procedure of Example I, step 4 and using the corresponding intermediate compound of step 3 of this example, the following free base compounds are obtained:

(1) 1-chloro-(2-dimethylamino-3-[p-toluenesulfonyl]) propanol, as an acid.
(2) 1-chloro-(2-dimethylamino-3-[p-chlorophenylsulfonyl])propanol, as an acid.

Step 5.—Following the procedure of Example I, step 5 and using the corresponding free base compound of step 4 of this example, the following products are obtained:

(1) N,N-dimethyl-3-(p-toluenesulfonyl)allylamine hydrochloride, M.P. 184–186° C.
(2) N,N-dimethyl-3-(p-chlorophenylsulfonyl)allylamine hydrochloride, M.P. 142–144° C.

EXAMPLE IV

Step 1.—Following the procedure of Example I, step 1 and, in place of 3-phenylsulfonyl-2-propen-1-ol and starting with (1) 3-(p-toluenesulfonyl)-2-propen-1-ol,
(2) 3-(p-chlorophenylsulfonyl)-2-propen-1-oil, and in place of morpholine starting with pyrrolidine, the following intermediate products are obtained:

(1) 2-pyrrolidino-3-(p-toluenesulfonyl)-2-propen-1-ol, and
(2) 2-pyrrolidino-3-(p-chlorophenylsulfonyl)-2-propen-1-ol.

Step 2.—Following the procedure of Example I, step 2 and using the corresponding intermediate compound of step 1 of this example, the following intermediate salts are obtained:

(1) 2-pyrrolidino-3-(p-toluenesulfonyl)-2-propen-1-ol hydrochloride, M.P. 178°–180° C.
(2) 2-pyrrolidino-3-(p-chlorophenylsulfonyl)-2-propen-1-ol hydrochloride, M.P. 204°–206° C.

Step 3.—Following the procedure of Example I, step 3 and using the corresponding intermediate salt of step 2 of this example, the following intermediate compounds are obtained:

(1) 1-chloro-(2-pyrrolidino-3-[p-toluenesulfonyl]) propanol hydrochloride, M.P. 161–163° C.
(2) 1-chloro-(2-pyrrolidino-3-[p-chlorophenylsulfonyl]) propanol hydrochloride, M.P. 136–138° C.

Step 4.—Following the procedure of Example I, step 4 and using the corresponding intermediate compound of step 3 of this example, the following free base compounds are obtained:
(1) 1-chloro-(2-pyrrolidino-3-[p-toluenesulfonyl])propanol, as an oil.
(2) 1-chloro-(2-pyrrolidino-3-[p-chlorophenylsulfonyl])propanol, as an oil.

Step 5.—Following the procedure of Example I, step 5 and using the corresponding free base compound of step 4 of this example, the following products are obtained:
(1) 1-(3-[p-toluenesulfonyl])-pyrrolidine hydrochloride, M.P. 159°–161° C.
(2) 1-(3-[p-chlorophenylsulfonylallyl])-pyrrolidino hydrochloride, M.P. 174°–176° C.

EXAMPLE V

Step 1.—Following the procedure of Example I, step 1 and in place of 3-phenylsulfonyl-2-propen-1-ol and starting with
(1) 3-(p-methoxyphenylsulfonyl)-2-propen-1-ol,
(2) 3-(3,4-dichlorophenylsulfonyl)-2-propen-1-ol, and in place of morpholine starting with piperidine, the following intermediate products are obtained:
(1) 2-piperidino-3-(p-methoxyphenylsulfonyl)-2-propen-1-ol,
(2) 2-piperidino-3-(3,4-dichlorophenylsulfonyl)-2-propen-1-ol.

Step 2.—Following the procedure of Example I, step 2 and using the corresponding intermediate compound of step 1 of this example, the following intermediate salts are obtained:
(1) 2-piperidino-3-(p-methoxyphenylsulfonyl)-2-propen-1-ol hydrochloride,
(2) 2-piperidino-3-(3,4-dichlorophenylsulfonyl)-2-propen-1-oil hydrochloride.

Step 3.—Following the procedure of Example I, step 3 and using the corresponding salt of step 2 of this example, the following intermediate compounds are obtained:
(1) 1-chloro-(2-piperidino-3-[p-methoxyphenylsulfonyl])-propanol hydrochloride,
(2) 1-chloro-(2-piperidino-3-[p-3,4-dichlorophenylsulfonyl])-propanol hydrochloride.

Step 4.—Following the procedure of Example I, step 4 and using the corresponding intermediate compound of step 3 of this example, the following free base compounds are obtained:
(1) 1-chloro-(2-piperidino-3-[p-methoxyphenylsulfonyl])-propanol,
(2) 1-chloro-(2-piperidino-3-[p-3,4-dichlorophenylsulfonyl])-propanol.

Step 5.—Following the procedure of Example I, step 5 and using the corresponding free base compound of step 4 of this example, the following products are obtained:
(1) 1-(3-[p-methoxyphenylsulfonylallyl])-piperidine hydrochloride,
(2) 1-(3-[3,4-dichlorophenylsulfonylallyl])-piperidine hydrochloride.

What is claimed is:
1. A compound of the formula

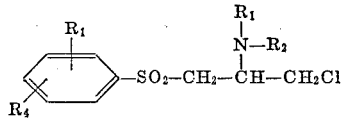

wherein
$R_1$ and $R_2$ are independently, hydrogen, lower alkyl having 1 to 6 carbon atoms, or $NR_1R_2$ are together

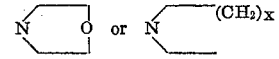

wherein
X is 0 or 1,
$R_3$ and $R_4$ are lower alkyl having 1 to 4 carbon atoms, lower alkoxy having 1 to 4 carbon atoms or halo having an atomic weight of 19 to 36, or
a pharmaceutically acceptable acid addition salt thereof.

2. A compound of the formula

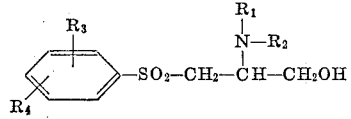

wherein
$R_1$ and $R_2$ are independently, hydrogen, lower alkyl having 1 to 6 carbon atoms, or $NR_1R_2$ are together

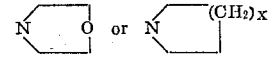

wherein
X is 0 or 1,
$R_3$ and $R_4$ are lower alkyl having 1 to 4 carbon atoms, lower alkoxy having 1 to 4 carbon atoms or halo having an atomic weight of 19 to 36, or
a pharmaceutically acceptable acid addition salt thereof.

References Cited

UNITED STATES PATENTS 3,644,343   2/1972   Manning _____ 260—240 R

FOREIGN PATENTS 355,783   9/1961   Switzerland _____ 260—570.5

JOHN D. RANDOLPH, Primary Examiner

U.S. Cl. X.R.

424—243, 267, 274, 330; 260—293.73, 326.5 SP, 326.82, 570.5 S